US008425692B2

(12) United States Patent
Rivera et al.

(10) Patent No.: US 8,425,692 B2
(45) Date of Patent: *Apr. 23, 2013

(54) PROCESS AND COMPOSITION FOR TREATING METAL SURFACES

(75) Inventors: José B. Rivera, Auburn, PA (US); Richard J. Church, Myerstown, PA (US)

(73) Assignee: Bulk Chemicals, Inc., Reading, PA (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/789,108

(22) Filed: May 27, 2010

(65) Prior Publication Data

US 2011/0293841 A1 Dec. 1, 2011

(51) Int. Cl.
*C23C 22/34* (2006.01)
*C23C 22/30* (2006.01)

(52) U.S. Cl.
USPC .......................... 148/267; 148/247; 148/264

(58) Field of Classification Search .................. 148/247, 148/267, 264
See application file for complete search history.

(56) References Cited

U.S. PATENT DOCUMENTS

| | | | |
|---|---|---|---|
| 4,359,348 | A | 11/1982 | Crotty |
| 4,578,122 | A | 3/1986 | Crotty |
| 4,749,418 | A | 6/1988 | Saeki et al. |
| 4,786,336 | A | 11/1988 | Schoener et al. |
| 5,091,023 | A | 2/1992 | Saeki et al. |
| 5,133,947 | A | 7/1992 | Stambaugh et al. |
| 5,294,266 | A | 3/1994 | Hauffe et al. |
| 5,859,106 | A | 1/1999 | Jones et al. |
| 7,291,217 | B2 | 11/2007 | Phelps et al. |
| 2002/0053301 | A1 | 5/2002 | Matzdorf et al. |
| 2002/0117236 | A1 | 8/2002 | Matzdorf et al. |
| 2004/0231754 | A1 | 11/2004 | Phelps et al. |
| 2006/0180247 | A1 | 8/2006 | Matzdorf et al. |
| 2006/0191599 | A1 | 8/2006 | Matzdorf et al. |
| 2006/0240191 | A1 | 10/2006 | Matzdorf et al. |
| 2007/0187001 | A1 | 8/2007 | Kramer et al. |
| 2009/0280253 | A1* | 11/2009 | Church ........................ 427/309 |
| 2010/0015339 | A1 | 1/2010 | Morillo et al. |
| 2010/0300891 | A1 | 12/2010 | Rivera |

FOREIGN PATENT DOCUMENTS

| | | |
|---|---|---|
| EP | 2 014 793 A2 | 1/2009 |
| WO | WO 2009/137358 A1 | 11/2009 |

OTHER PUBLICATIONS

Paniagua et al., "Determination of Chromium(VI) and Chromium(III) by using a Diphenylcarbazide-Modified Carbon Paste Electrode", Electroanalysis, vol. 5, No. 2, Apr. 9, 2005, pp. 155-163.
International Search Report dated Dec. 17, 2010, Int'l Appl. No. PCT/US2010-036392.
Coolbaugh, M. Todd, et al., "Readiness of Trivalent Chromium Conversion Coatings for Aluminum Alloys," Corrosion 2000, Mar. 26-31, 2000, pp. 1-11; Orlando, FL; US.
Oleinik, S. V., et al.; "Corrosion Inhibitors in Conversion Coatings. IV"; Protection of Metals, 2007, vol. 43, No. 4; pp. 391-397; Pleiades Publishing, Inc.; Austin, TX; US.
Communication Relating to the Results of the Partial International Search dated Aug. 10, 2010.

* cited by examiner

*Primary Examiner* — Lois Zheng
(74) *Attorney, Agent, or Firm* — RatnerPrestia

(57) ABSTRACT

A composition for forming a protective coating on a metal surface includes water;
$Cr_2(GF_6)_3$ in which G is a Group IV-B element; and
at least one polymer having a plurality of carboxylic acid groups and at least one polymer having a plurality of hydroxyl groups, and/or at least one polymer having a plurality of both carboxylic acid and hydroxyl groups;
wherein the composition contains less than 500 ppm of alkali metal ions and less than 200 ppm of halide ions relative to chromium. A method of forming a protective coating on a metal surface includes contacting the metal surface with the composition.

15 Claims, No Drawings

PROCESS AND COMPOSITION FOR TREATING METAL SURFACES

BACKGROUND OF THE INVENTION

Hexavalent chromium compounds have been used as traditional conversion coatings to treat metal surfaces to improve their corrosion resistance and paint adhesion. Unfortunately, hexavalent chromium shows toxicological effects and has been determined by the Environmental Protection Agency as a risk to the environment and by the Occupational Safety and Health Agency as a health risk. Moreover, chemistries based on hexavalent chromium are classified as carcinogens by these agencies. Thus, it would be of significant value to provide coatings and processes that are free of hexavalent chromium, but still capable of improving paint adhesion and corrosion resistance of metal surfaces.

SUMMARY OF THE INVENTION

In one aspect, the invention provides a composition for forming a protective coating on a metal surface. The composition includes water;
$Cr_2(GF_6)_3$ in which G is a Group IV-B element; and
at least one polymer having a plurality of carboxylic acid groups and at least one polymer having a plurality of hydroxyl groups, and/or at least one polymer having a plurality of both carboxylic acid and hydroxyl groups. The composition contains less than 500 ppm of alkali metal ions and less than 200 ppm of halide ions relative to chromium.

In another aspect, the invention provides a method of forming a protective coating on a metal surface. The method includes applying the above composition to the metal surface and subsequently drying the contacted metal surface.

In yet another aspect, the invention provides a method of preparing an aqueous composition of a chromium III compound. The method includes adding hydrogen peroxide to a mixture including water and a chromium VI compound in the presence of at least one acid according to the formula $H_2GF_6$, in which G is a Group IV-B element.

In a further aspect, the invention provides an aqueous composition that includes dissolved $Cr_2(GF_6)_3$, in which G is a Group IV-B element, and contains less than 500 ppm of alkali metal ions and less than 200 ppm of halide ions, relative to chromium and which tests negative for chromium VI using s-diphenylcarbazide.

In still another aspect, the invention provides a method of treating a metal surface. The method includes contacting the metal surface with an aqueous composition including dissolved $Cr_2(GF_6)_3$, in which G is a Group IV-B element, and containing less than 500 ppm in total of alkali metal ions and less than 200 ppm of halide ions, relative to chromium.

DETAILED DESCRIPTION OF THE INVENTION

The entire disclosure of U.S. patent application Ser. No. 12/474,960, filed May 29, 2009, is expressly incorporated by reference herein.

It has now been found that aqueous coating compositions comprising one or more of certain chromium III salts provide excellent corrosion resistance and paint adhesion on metal surfaces, when used either alone or in combination with one or more polymers having a plurality of carboxylic acid groups and one or more polymers having a plurality of hydroxyl groups. Alternatively, a polymer containing a plurality of both carboxylic and hydroxyl groups may be used with the chromium III salts. It has further been found that such compositions can be prepared in a manner that provides very low levels of contaminating ions, thus making it easier to use these compositions without buildup of such ions and resulting diminishment of corrosion resistance.

Chromium III Salts

The chromium III salts used in the compositions of the invention are produced by a novel reaction process, and are believed to be salts of Group IV-B fluoacids according to the general formula $Cr_2(GF_6)_3$ in which G represents a Group IV-B metal (Zr, Ti or Hf). These salts are essentially free of contaminating ions, i.e., essentially free of ions that are not part of the canonical formula of the salt, and they will be referred to herein as "high-purity" chromium salts with the understanding that trace amounts of contaminating ions may be present, typically as a result of impurities in the ingredients.

It is possible to make a variety of high-purity chromium III salts using the methods disclosed herein, including but not limited to the salts of Group IV-B fluoacids noted above. For simplicity, the inventors will describe the invention with respect to chromium III fluozirconate and compositions that include it, but it will be understood that analogous procedures may be used to make and use other high-purity chromium III salts as well.

High-purity chromium fluozirconate according to the invention can be made by a process that includes reducing aqueous chromic acid and/or partially reduced aqueous chromic acid with hydrogen peroxide, which is itself oxidized in the process to form gaseous $O_2$. If chromic acid is used, the reaction is believed to proceed according to the equation shown below, although the inventors do not intend to be bound by this proposed explanation. The skilled artisan will recognize that $CrO_3$ is the anhydrous form of chromic acid and is used in the following equation for simplicity.

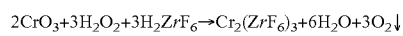

$$2CrO_3+3H_2O_2+3H_2ZrF_6 \rightarrow Cr_2(ZrF_6)_3+6H_2O+3O_2\downarrow$$

During the reaction and afterwards, the mixture remains essentially fully liquid and essentially free (i.e., only trace amounts, if any) of precipitates or suspended undissolved solids. The fluozirconic acid may be added simultaneously with the hydrogen peroxide, or may be admixed with the chromic acid prior to adding the hydrogen peroxide, or a combination of these.

If partially reduced chromic acid is used as the starting material, in some embodiments it is prepared by reaction of chromic acid with an organic compound (for example, formaldehyde or methanol) which is oxidized by the chromic acid and results in partial reduction of the chromium. In practice, more than a stoichiometric amount of hydrogen peroxide may in some cases be needed to achieve full reduction of the chromium VI in chromic acid to chromium III. This may be the result of decomposition and/or volatilization of some amount of hydrogen peroxide during the reaction. Essentially no chromium VI remains after the hydrogen peroxide reaction is complete, as indicated by a negative test using the s-diphenylcarbazide method (ASTM D 1687-02, Chromium in Water, Test Method A), which produces a red-violet color in the presence of chromium VI.

Mixtures of high-purity chromium III salts can also be made by the above procedure, using mixed acids instead of a single acid such as fluozirconic. Formation of chromium III salts by the methods of this invention is believed to be general for a variety of salts, barring any specific detrimental interaction of the anion.

Using the preparative methods described herein, no mixing of separate trivalent chromium compounds (for example, $CrF_3$) with fluozirconic acid is required to form the chromium III fluozirconate, and so no extraneous anions or cations are present in greater than trace amounts. As a result, the purity of the chromium III salt is determined mainly by the purity of the raw materials used to prepare it. The salt, presumably $Cr_2(ZrF_6)_3$, functions well in metal pretreatment compositions to improve the corrosion resistance of the substrate.

The methods of this invention make it possible to prepare chromium III salts with very low levels of contaminating cations and anions. In some embodiments, the amount of any given contaminating cation (typically a metal, especially an alkali metal) is less than 1000 ppm, or less than 500 ppm, or less than 300 ppm, or less than 200 ppm, relative to chromium. These limits may also apply specifically to the total of all alkali metal ions, or even to all metal ions in total.

Similarly, the content of contaminating anions may be very low, and in some embodiments the amount of any given contaminating ion is less than 1000 ppm, or less than 500 ppm, or less than 300 ppm, or less than 200 ppm, relative to chromium. In particular, these limits may apply individually to each of fluoride, chloride, bromide, iodide, nitrate and sulfate. These limits may also apply to the total of all of these anions, or even to all anions in total (including other anions not listed here).

An alternative method of making the chromium III fluozirconate according to the invention is to first produce hydrous chromium oxide, sometimes referred to as hydrated chromium oxide or hydrated chrome oxide. This material, approximately of the formula $Cr_2O_3 \cdot nH_2O$ or perhaps $Cr(OH)_3$, can be made by reaction of $Cr_2(SO_4)_3$ (chrome alum) with a base such as NaOH. This approach requires washing out or otherwise removing the $Na_2SO_4$ byproduct from the resulting hydrous chromium oxide so as to produce a product essentially free of contaminating cations and anions. Once such washing is complete, the hydrous chromium oxide is contacted with fluozirconic acid to form aqueous high-purity chromium III fluozirconate.

In all of the above methods, the molar ratio of zirconium to chromium in the final product will typically be about 1.5:1, as indicated by the stoichiometry implicit in the formula $Cr_2(ZrF_6)_3$. This calculates to a weight ratio of 2.63:1. The composition need not contain only $Cr_2(ZrF_6)_3$, however. Thus, the weight ratio can vary somewhat from the stoichiometric value. The ratio will typically be at least 2.4:1, more typically at least 2.5:1, and most typically at least 2.6:1. The weight ratio will typically be at most 3.0:1, more typically at most 2.9:1, and most typically at most 2.8:1. These ratios may be converted to their equivalent mole ratios, and the corresponding weight ratios may then be calculated for $Cr_2(TiF_6)_3$ and $Cr_2(HfF_6)_3$.

The purity of the chromium III fluozirconate provided by the invention may be very high, even of reagent grade. High-purity chromium III fluozirconate is suitable for use in any application for which the use of chromium III fluozirconate is known, for example in electroplating baths.

Chromium fluozirconate prepared as described herein provides excellent corrosion protection on metal surfaces, including at least Al, Zn and alloys of either of these, and may also be useful for providing a passivation layer for electroplating.

In some embodiments of the invention, chromium fluozirconate is used in combination with polymers having a plurality of carboxylic acid groups and polymers having a plurality of hydroxyl groups. Or, a single polymer containing both may be used with the chromium fluozirconate instead of, or in addition to, the two separate polymers.

Polymers having a plurality of carboxylic acid groups include, as nonlimiting examples, polyacrylic acid and copolymers of methyl vinyl ether and maleic acid. Polymers having a plurality of hydroxyl groups include, as nonlimiting examples, polyvinyl alcohols and homopolymers or copolymers of hydroxyethyl methacrylate. Exemplary polymers having both carboxylic and hydroxyl functionality in the same molecule include free-radical copolymers of hydroxyethyl methacrylate and methacrylic acid.

Metal Treatment Formulations Comprising High-Purity Chromium III Fluozirconate

High-purity chromium III fluozirconate may be used to treat metal surfaces to improve corrosion resistance. In practical use, the absence of extraneous cations and anions provides a significant advantage. This is because chromium III fluozirconate solutions made by an alternative process such as mixing $CrF_3$ with fluozirconic acid, for example, contain extraneous fluoride ions that continue to build up in concentration as the metal treatment bath is replenished with additional chromium III fluozirconate solution, as it is consumed by the metal being treated. Such buildup can cause the treatment coating to become weak and can also cause sludge to form in the bath. These problems may be practically eliminated by using the high-purity chromium III fluozirconate solutions of this invention. Further, the high purity makes it possible to merely dry the solution in place on the treated metal surface without rinsing, if so desired, thereby saving a step and reducing waste handling.

Any metal may be treated, with particularly good results being obtained on zinc, zinc alloy, aluminum, and aluminum alloy surfaces. As used herein, the term "zinc alloy" means an alloy in which zinc is present at a weight percent greater than that of every other metal in the alloy. The term "alloy" is similarly defined for every other metal to which the term is applied. Metal alloys typically contain at least 50 wt % of the named metal.

High-purity chromium III fluozirconate may be applied alone from aqueous solution to a metal surface and subsequently dried to remove water, resulting in effective passivation of the surface. Alternatively, it may be mixed with an organo-functional silane such as aminopropyl triethoxysilane to make a metal treatment formulation. The addition of organo-functional silanes may improve adhesion of subsequently applied coatings (such as paints) to the treated surfaces, while maintaining good corrosion resistance in a Neutral Salt Spray test.

As used herein, the term "organo-functional silane" means a compound having: (1) a silane radical (e.g., silyl (—$SiH_3$), disilanyl (—$Si_2H_5$), etc.); (2) an organic group (such as an alkyl, an aryl or an alkoxy group); and (3) a functional group. Typical organo-functional silanes have two different reactive groups on the silicon atom, and may for example be according to the formula X—RSi(OR')$_{3-n}$R$_n$", where n=0, 1, 2. The R' and R" groups are typically alkyl, for example methyl, ethyl or a C3-C4 alkyl, and in some cases R' is acetyl. R is typically an alkanediyl group, for example a $CH_2$ or a linear C2-C3 moiety. The X groups may include, but are not limited to, amino, epoxy, vinyl, mercapto, methacryloxy and glycidoxy groups. Without being bound by any theory, it is believed that the organo-functional silane serves to bond with, or assist in bonding among, either the other constituents in the pretreatment composition or the constituents of other compositions or the metal surface itself or some combination thereof. Exemplary suitable organo-functional silanes include aminopropyltriethoxy silane, mercapto silanes, and epoxy silanes. Aminopropyltriethoxy silane is sold under various trade names, including AMEO and SILWET® A-1100, and a suitable epoxy functional silane is sold under the trade name of HYDROSIL™ 2759.

Additional components that are well known in the art may also be included in compositions of the present invention. For example, wetting agents, such as fluorosurfactants, may be included. Thickeners may also be included if a higher viscosity is needed for a given application. Exemplary thickeners include CARBOPOL® EZ-2, available from Lubrizol, and METHOCEL® F4M, available from Dow. Finally, if necessary, a compatible biocide, such as a 1,2-benzisothiazolin-3-one biocide sold under the trademark NIPACIDS BIT 20 by Clarion of Charlotte, N.C. or a product sold under the trademark NUOSEPT 495 by ISP Chemicals of Calvert City, Ky., can be included to inhibit biological growth in a working bath. Any of these components, as well as organo-functional silanes, may also be included in compositions containing polymers as described below.

The pH of metal treatment formulations not including such polymers will typically be at least 2.5, more typically at least 3.0, and most typically at least 3.5. The pH will typically be at most 5.5, more typically at most 5.0, and most typically at most 4.5. The concentration of chromium (measured as the metal) will typically be in a range from 0.0029% to 0.029% wt %, more typically in a range from 0.007% to 0.010% wt %.

As noted above, high-purity chromium III fluozirconate may also be included in a composition further comprising a polymer having a plurality of carboxylic acid groups and a polymer having a plurality of hydroxyl groups. Typically, such a composition will be aqueous and absent any significant amounts of other solvents. For a working bath, the following properties are typical. The pH will typically be in a range from 2.5 to 4.0, more typically in a range from 2.8 to 3.2. The level of chromium III fluozirconate (and/or other chromium III fluoacid salts in total) will typically be in a range from 0.02% to 0.20%, more typically in a range from 0.05% to 0.07%. The one or more polymers having a plurality of carboxylic acid groups will in total typically be present in a range from 0.00375% to 0.0375%, more typically in a range from 0.010% to 0.020%. The one or more polymers having a plurality of hydroxyl groups will in total typically be present in a range from 0.0016% to 0.020% more typically in a range from 0.0064% to 0.008%. Organo-functional silanes, if present, will in total typically be present in a range from 0.04% to 0.40%, more typically in a range from 0.18% to 0.22%.

Compositions according to the invention also include concentrates that, upon appropriate dilution, afford formulations as described immediately above. The level of concentration will typically be such that they require dilution in a range of 50:1 to 100:1 by volume to reach working bath concentration.

In some embodiments, the compositions of this invention are essentially free (i.e., only trace amounts, if any) of precipitates or suspended undissolved solids. In some embodiments of the invention, the compositions are free of polymers other than those defined above having a plurality of carboxylic acid and/or hydroxyl groups. In some embodiments, the compositions are free of polymers having phosphonic acid groups and/or polymers having sulfonic acid groups. In some embodiments, no metal compounds are included in the compositions of this invention other than as specified above.

EXAMPLES

Glossary

8X202Q powder paint system from Akzo Nobel
AAMA 2603 American Architectural Manufacturers Association specification
AAMA 2605 American Architectural Manufacturers Association specification
BULK KLEEN® 737G non-etching silicated alkaline cleaner from Bulk Chemicals, Incorporated, Reading, Pa.
BULK KLEEN® 749 KOH based, non-smutting cleaner from Bulk Chemicals, Incorporated
BULK KLEEN® 678 Hydrofluoric acid based oxide remover from Bulk Chemicals, Incorporated
BULK BOND® 1047 19% Hydrofluoric acid from Bulk Chemicals, Incorporated
BULK BOND® 1407 Hexavalent chromium phosphate conversion coating composition from Bulk Chemicals, Incorporated
BULK RINSE® 6A partially reduced chromic acid from Bulk Chemicals, Incorporated
CELVOL® 08-125 polyvinyl alcohol (8 wt % solution) from Celanese Corporation DIW deionized water
E-CLPS® 1900 chrome-free pretreatment from Bulks Chemicals, Incorporated
E-CLPS® 2101 chrome-free pretreatment from Bulk Chemicals, Incorporated GANTREZ® S97-BF Methyl vinyl ether/maleic acid copolymer, 12-13% aqueous solution. from International Specialty Products, Wayne, N.J.
Qualicoat specifications: Specifications for a Quality Label for Paint, Lacquer and Powder Coatings on Aluminum for Architectural Applications, $9^{th}$ edition, effective January, 2000, Qualicoat, Zurich, Switzerland
SILWET® A1100 aminopropyl triethoxysilane from Crompton Corporation, Greenwich, Conn.
TRINAR® fluoropolymer coating from Akzo Nobel
Valspar A201 Alenco Poly 3500 liquid paint from Valspar Corporation, Minneapolis, Minn.

Preparation of High-Purity Chromium III Fluozirconate

Example 1

Aqueous chromic acid was placed into a beaker and fluozirconic acid was added. Hydrogen peroxide was then added with stirring until complete reduction of chromium was indicated by a very sharp color change from yellow-green to blue-green. A test for hexavalent chromium using s-diphenylcarbazide (a reagent specific to hexavalent chromium capable of detection of hexavalent chromium at levels at sub-micrograms per liter levels) was negative, confirming complete conversion to trivalent chromium.

Specific quantities are as below:
chromic acid (nominal 40%, aqueous)—36.2 g
fluozirconic acid (nominal 45%, aqueous)—100.0 g
hydrogen peroxide (nominal 35%, aqueous)—24.6 g+5.0 g extra

Example 2

A mixture of chromic acid and fluozirconic acid was provided by dissolving chromium trioxide (reagent grade) in aqueous fluozirconic acid, and hydrogen peroxide was then added while mixing at a high rate to reduce the hexavalent chromium to chromium III. Completion of the reduction was signaled by the change in color from yellow-green to blue-green, and confirmation of the conversion was by s-diphenylcarbazide.

Specific Quantities:
chromium trioxide ($CrO_3$)—93.8 g
fluozirconic acid (45%, aqueous)—648.1 g
hydrogen peroxide (35%, aqueous)—258.1 g+23.5 g extra

Example 3

BULK RINSE® 6A, a partially reduced chromic acid, was added to fluozirconic acid, and sufficient hydrogen peroxide was then added to complete the reduction of chromium VI to chromium III. The color once again indicated completion of the reduction, which was again confirmed by s-diphenylcarbazide addition.

Example 4

A large-scale preparation of $Cr_2(ZrF_6)_3$ was prepared in a manner analogous to Example 2 above, using the following amounts of ingredients.

chromic acid liquid (40%)—56.7 lbs
fluozirconic acid 156.3 lbs
hydrogen peroxide—62.2 lbs Reduction of chromium VI to chromium III was complete well before all of the hydrogen peroxide was added, but the rest of the hydrogen peroxide was still added. Apparently, this run did not require as great an excess of hydrogen peroxide as for the smaller scale preparations, although the reason for this is not completely clear.

Metal Treatment with High-Purity Chromium III Fluozirconate

The effectiveness of high-purity chromium III fluozirconate for passivating aluminum 2024 and 6061 panels was investigated according to U.S. Military specification MIL-DTL-81706B, dated 25 Oct. 2004. In particular, see reference to Type 2 non-chromate products. The treatment protocol was as shown below, and is similar to that disclosed in U.S. patent application Ser. No. 12/116,513 filed May 7, 2008, the entirety of which is incorporated herein by reference.

1) Clean—BULK KLEEN® 737G, 15 g/L , 140° F., 5 minutes
2) Rinse—Tap water, ambient temperature, 30 seconds
3) Deionized water rinse, ambient temperature
4) Chromium III treatment: panels immersed at 100° F., 5 minutes (See below for details of treatments)
5) Rinse with deionized water: ambient temperature, 30 seconds (for seal application the two steps below are included)
6) Seal; E-CLPS® 1900 chrome-free pretreatment, 2% v/v dilution, ambient temperature, 30 seconds
7) Dry: 130° F. oven, 5 minutes A chromium III composition was prepared, including the following components:

| Constituent | Wt. % |
| --- | --- |
| 45% Fluozirconic Acid | 4.27 |
| Chromium (III) Fluoride Tetrahydrate | 1.05 |
| Ammonium Bifluoride | 0.0125 |
| Aminopropyl Triethoxysilane | 4.78 |
| Water | balance |

This composition, which had a Zr:Cr weight ratio of 2.80:1, was diluted with water to 4% of its original strength before being used to treat aluminum panels, as a control.

High-purity chromium III fluozirconate was prepared according to the method of Example 2, and supplied as a 37.9% stock solution. The solution was determined to have the following composition by weight, based on stoichiometric calculations using $Cr_2(ZrF_6)_3$ as the compound formula: 5.47% Cr, 14.42% Zr, 8.0% F and Zr:Cr=2.6:1 by weight. This stock solution was used in the following examples, diluted as indicated. In each case, treated panels were exposed to Neutral Salt Spray (NSS) for 336 hours according to ASTM B117, then rinsed and evaluated for pitting.

Example 5

A 0.121% dilution of the high-purity chromium III fluozirconate stock solution in deionized water was prepared, yielding the same level of Cr as in the control. This solution was adjusted to pH =4 using ammonium carbonate. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels. Thus, the high purity chromium III fluozirconate solution produced good results while avoiding the presence of extraneous fluoride ion, such as was present in the control formulation.

Example 6 a) A 2.21 g/L bath of the high-purity chromium III fluozirconate stock solution was prepared and 1.90 g/L of SILWET® A1100 aminopropyl triethoxysilane was added to yield a similar amount of silane as in the control formulation. When heated to 100° F., this solution was hazy. Fluozirconic acid (1.5 g/L) was added to this bath to reach a pH of 4.0. While not as hazy, some floc was noted. The Zr to Cr ratio for this solution was 3.86:1. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

b) Another bath was prepared using 2.21g/L of the high-purity chromium III fluozirconate stock solution and 0.22 g/l of $H_2ZrF_6$ heated to 100° F., and pH adjusted to 4.0 with ammonium carbonate. The bath was noted to be hazy. The Zr to Cr ratio for this bath was 3.0:1. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

c) Still another bath was prepared using a 2.21g/L of the high-purity chromium III fluozirconate stock solution, and SILWET® A1100 1.0 g/L was added, resulting in a pH of 4.0 at 100° F. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

Example 7

A bath composed 0.22 g/L of the high-purity chromium III fluozirconate stock solution in water was adjusted with SILWET® A-1100 (1.0 g/L) to bring the pH up to 4.0. The resulting Zr:Cr ratio was 2.6:1 by weight. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

A final modification was made by adding 0.22 g/L of $H_2ZrF_6$ to the above bath to give a Zr to Cr ratio of 3.0:1. SILWET® A1100 (0.7 g/L) was further added to bring the pH of the bath to 4.0. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

As the foregoing examples show, high-purity chromium III fluozirconate was effective as a standalone passivant for aluminum at a pH of 4.0 and at the concentrations tested, with or without subsequent sealing with E-CLPS® 1900 chrome-free pretreatment. The skilled person will appreciate that, depending on the type of metal being treated, optimization of pH, temperature, exposure time, Zr:Cr ratio, and/or chromium III concentration may be adjusted to provide the best performance.

Preparation and Use of Pretreatment Compositions

Example 8

Compositions according to the invention were prepared at two levels of concentration, as shown in Table 1.

TABLE 1

Pretreatment Compositions

|  | Concentrate | Working Bath (Composition 1) |
|---|---|---|
| $Cr_2(ZrF_6)_3$ | 6.0% | 0.063% |
| CELVOL ® 08-125 | 9.0% | 0.093% |
| GANTREZ ® S97-BF | 11.3% | 0.117% |
| DIW | Balance | Balance |
| pH | 1.5 | 2.8-3.0 |

The composition at the Working Bath concentration was compared against chrome phosphate (BULK BOND® 1407/1047) and a non-chrome formulation (E-CLPS® 2101). All compositions were applied to 3"×12"×0.090" 6063 aluminum alloy panels (referred to as "extrusion panels") by spraying, using the sequence of steps described in Table 2.

TABLE 2

Spray Application Processes for Various Pretreatments

| Process | Stage 1 | Stage 2 | Stage 3 | Stage 4 | Stage 5 |
|---|---|---|---|---|---|
| 1 | BULK KLEEN ® 749 | Rinse | BULK KLEEN ® 678 | Rinse | E-CLPS ® 2101 |
| 2 | BULK KLEEN ® 749 | Rinse | BULK KLEEN ® 678 | Rinse | Composition 1 |
| 3 | BULK KLEEN ® 749 | Rinse | Chrome Phosphate | Rinse | Rinse |

Process details:
Stage 1 BULK KLEEN® 749: 1% v/v, 135° F., 1 minute
Stage 2 Rinse: tap water, ambient, 30 seconds
Stage 3 BULK KLEEN® 678: 0.25% v/v, ambient, 30 seconds
Stage 3 Chrome Phosphate: 0.75% v/v BULK BOND® 1047+4.40% BULK BOND® 1407, 100-120° F., 30 seconds
Stage 4 Rinse: DIW, ambient, 30 seconds
Stage 5 E-CLPS® 2101: 1% v/v, ambient, 60 seconds, followed by drying in a 300° F. oven for 3-4 minutes
Stage 5 Composition 1: ambient, 60 seconds, followed by drying in a 300° F. oven for 3-4 minutes
Stage 5 Rinse (Process 3): DIW, ambient, 30 seconds, followed by drying in a 300° F. oven for 3-4 minutes The above treatments produced the following coating weights on the pretreated panels:
E-CLPS® 2101: 5.4 mg/ft$^2$
Composition 1: Cr=0.28 mg/ft$^2$, Zr=0.1 mg/ft$^2$, Total=5.5 mg/ft$^2$ (based on weigh-strip-weigh)
Chrome Phosphate: 75.8 mg/ft$^2$ The pretreated panels were then painted with one of two AAMA 2605-compliant paints: TRINAR® liquid primer/topcoat system from Akzo Nobel, film thickness=1.00-1.50 mil, pencil hardness=H; and 8X202Q powder system from Akzo Nobel, film thickness=2.00-3.90 mil, pencil hardness=H. Panels were evaluated with respect to the performance properties shown in Tables 3 and 4, all according to AAMA 2605 except where indicated.

TABLE 3

Performance of Pretreatments with AAMA 2605 Powder Paint

| Test | E-CLPS® 2101 | Composition 1 | Chrome Phosphate |
|---|---|---|---|
| Dry Adhesion | Pass | Pass | Pass |
| Wet Adhesion | Pass | Pass | Pass |
| Boiling Water Adhesion | Pass | Pass | Pass |
| Detergent Resistance | Pass | Pass | Pass |
| Muriatic Acid Resistance | Pass | Pass | Pass |
| Window Cleaner Resistance | Pass | Pass | Pass |
| Impact Resistance | Pass | Pass | Pass |
| [1]Acetic Acid Salt Spray 1000 hours | Pass | Pass | Fail |
| [2]Neutral Salt Spray 4000 hours | Scribe = 10 Field = 10 | Scribe = 10 Field = 10 | Scribe = 10 Field = 10 |
| Humidity, 4000 hours | 10 | 10 | 10 |

[1]per Qualicoat specifications, 9th edition, effective January, 2000
[2]Salt spray conditions per ASTM B117, panel evaluation per ASTM-D1654

The Qualicoat specification for 1000 hour acetic acid salt spray requires infiltration from the scribe not to exceed 16 mm$^2$ over a scribe length of 10 cm and the length of any single infiltration not to exceed 4 mm. A scribe of 10 indicates mean creepage of 0mm from the scribe. A value of 10 in the "field" (unscribed area) indicates 0 area % of blistering or paint loss in the field. Humidity panels are unscribed, and the entire panel is considered to be the field.

TABLE 4

Performance of Pretreatments with AAMA 2605 Powder Paint

| Test | E-CLPS® 2101 | Composition 1 | Chrome Phosphate |
|---|---|---|---|
| Dry Adhesion | Pass | Pass | Pass |
| Wet Adhesion | Pass | Pass | Pass |
| Boiling Water Adhesion | Pass | Pass | Pass |
| Detergent Resistance | Pass | Pass | Pass |
| Muriatic Acid Resistance | Pass | Pass | Pass |
| Window Cleaner Resistance | Pass | Pass | Pass |
| Impact Resistance | Pass | Pass | Pass |
| [1]Acetic Acid Salt Spray 1000 hours | Pass | Pass | Pass |
| [2]Neutral Salt Spray 4000 hours | Scribe = 10 Field = 10 | Scribe = 10 Field = 10 | Scribe = 10 Field = 10 |
| Humidity, 4000 hours | 10 | 10 | 10 |

[1]per Qualicoat specifications, 9th edition, effective January, 2000
[2]Salt spray conditions per ASTM B117, panel evaluation per ASTM-D1654

Inspection of the panels revealed that chrome phosphate with powder paint clearly failed, with a total infiltration area of >16 mm$^2$. Panels treated with E-CLPS® 2101 with powder paint had minor infiltrations, but still passed the Qualicoat specification. Composition 1 with powder paint had virtually no infiltrations. All three pretreatment compositions with liquid paint passed the Qualicoat specification with virtually no infiltrations.

Unpainted panels were also evaluated after a 336-hour Neutral Salt Spray treatment per ASTM B117, using an untreated panel as control. The panels were evaluated qualitatively by visual inspection based on uniformity of appearance and amount of corrosion, and were ranked as follows (best to worst): Composition 1≈Chrome Phosphate>E-CLPS® 2101>No Pretreatment (corrosion present).

Example 9

A fresh sample of working bath was prepared from concentrate as described in Example 8, and had a pH of 2.8. A portion of the fresh working bath was treated to simulate an aged working bath, i.e., one that had been in use for a period of time to coat panels. The simulated aged working bath was prepared by dissolving a sufficient quantity of aluminum flake in the fresh working bath to yield 40 ppm of dissolved aluminum, and then the pH was restored to 2.8 by adding concentrate prior to application. The concentrations of metals in the baths were as shown in Table 5.

TABLE 5

Bath Composition

| Constituent | Fresh Bath | Aged Bath |
| --- | --- | --- |
| Cr (ppm) | 90 | 166 |
| Zr (ppm) | 240 | 481 |
| F (ppm) | 300 | 591 |
| Al (ppm) | 0 | 40 |

The fresh and simulated aged bath compositions were applied to extrusion panels by an immersion process, using the following sequence of steps: BULK KLEEN® 749 (1% v/v, 135° F., 2 minutes); rinse (ambient, 1 minute); BULK KLEEN® 678 (0.05% v/v, ambient, 1 minute); rinse (DIW, ambient, 1 minute); pretreatment with the bath composition (ambient, pH=2.8-3.0, 2 minutes); dry (150° F. oven, 5 minutes). Metal coating weights of the resulting pretreated panels were as shown in Table 6.

TABLE 6

Pretreatment Coating Weights

| | Cr (mg/ft$^2$) | Zr (mg/ft$^2$) | Total (mg/ft$^2$) based on Weigh-Strip-Weigh |
| --- | --- | --- | --- |
| Fresh Bath | 0.44 | 0.3 | 8.7 |
| Aged Bath | 0.78 | 0.5 | 15.7 |

The pretreated panels were then painted with one of two paints: TRINAR® liquid primer/topcoat system (AAMA 2605-compliant) from Akzo Nobel, and Valspar A201 Alenco Poly 3500 liquid paint (AAMA 2603-compliant). Panels were evaluated with respect to the performance properties shown in Tables 7 and 8, all according to AAMA 2603 and 2605 respectively, except where indicated.

TABLE 7

Fresh & Aged Pretreatments, AAMA 2603 Liquid Paint

| Test | $^2$Fresh Pretreatment | $^3$Aged Pretreatment |
| --- | --- | --- |
| Dry Adhesion | Pass | Pass |
| Wet Adhesion | Pass | Pass |
| Boiling Water Adhesion | Pass | Pass |
| Detergent Resistance | Pass | Pass |
| Impact Resistance | Pass | Pass |
| $^1$Neutral Salt Spray 1500 hours | Scribe = 10, Field = 10 | Scribe = 10, Field = 10 |
| Humidity 1500 hours | 10 | 10 |

$^1$Salt spray conditions per ASTM B117, panel evaluation per ASTM-D1654
$^2$film thickness = 0.85-2.10 mil, pencil hardness = 2H
$^3$film thickness = 1.00-1.75 mil, pencil hardness = 2H The 1500 hour neutral salt spray and humidity panels rated 10 according to ASTM D-1654 as described above, i.e., zero creepage from scribe and zero blistering or paint loss in the field.

TABLE 8

Fresh & Aged Pretreatments, AAMA 2605 Liquid Paint

| Test | $^3$Fresh Pretreatment | $^4$Aged Pretreatment |
| --- | --- | --- |
| Dry Adhesion | Pass | Pass |
| Wet Adhesion | Pass | Pass |
| Boiling Water Adhesion | Pass | Pass |
| Detergent Resistance | Pass | Pass |
| Impact Resistance | Pass | Pass |
| $^1$Acetic Acid Salt Spray 1000 hours | Pass | Pass |
| $^2$Neutral Salt Spray 4000 hours | Scribe = 10 Field = 10 | Scribe = 10 Field = 10 |
| Humidity 4000 hours | 10 | 10 |

$^1$per Qualicoat specifications, 9th edition, effective January, 2000
$^2$Salt spray conditions per ASTM B117, panel evaluation per ASTM-D1654
$^3$film thickness = 1.00-1.45 mil, pencil hardness = 2H
$^4$film thickness = 1.00-1.45 mil, pencil hardness = 2H The 1000 hour acetic acid salt spray panels passed the Qualicoat specification with no infiltrations.

Example 10

A second composition according to the invention was prepared as both a concentrate and at working bath strength, as shown in Table 9.

TABLE 9

Pretreatment Compositions

| | Concentrate | Working Bath (Composition 2) |
| --- | --- | --- |
| $Cr_2(ZrF_6)_3$ | 4.3% | 0.045% |
| CELVOL ® 08-125 | 9.0% | 0.093% |
| GANTREZ ® S97-BF | 11.3% | 0.117% |
| DIW | Balance | Balance |
| pH | 1.6 | 2.8-3.2 |

Fresh Composition 2 was evaluated along with an aged version, prepared as follows. A sufficient number of extrusion panels was processed through Composition 2 to give a total throughput of 100 ft$^2$ of panel surface area per gallon of bath volume. During the aging process, the pH of the bath was monitored and replenished with the concentrate at regular intervals. When 100 ft$^2$/gallon of throughput had been reached, a set of extrusion panels was pretreated for subsequent painting and testing. The metal contents of the fresh and aged compositions are shown in Table 10.

TABLE 10

Bath Composition

| Constituent | Fresh Bath | After Aging |
|---|---|---|
| Cr (ppm) | 65 | 247 |
| Zr (ppm) | 173 | 512 |
| F (ppm) | 216 | 1186 |
| Al (ppm) | 0 | 92 |

The fresh and aged compositions were applied to 3"×12"× 0.090" extrusion panels by an immersion process as follows: BULK KLEEN® 749 (1% v/v, 135° F., 2 minutes), rinse (ambient, 1 minute), BULK KLEEN® 678 (0.05% v/v, ambient, 1 minute), rinse (DI water, ambient, 1 minute), pretreatment (pH=2.8-3.2, ambient, 2 minutes), dry (150° oven, 5 minutes). The resulting pretreated panels had metal coating weights as shown in Table 11.

TABLE 11

Pretreatment Coating Weights

| | Cr (mg/ft$^2$) | Zr (mg/ft$^2$) | Total (mg/ft$^2$) (Based on Weigh-Strip-Weigh) |
|---|---|---|---|
| Fresh Bath | 0.84 | 0.6 | 16.8 |
| Aged Bath | 1.72 | 1.1 | 34.5 |

The pretreated panels were then painted with one of two paints: TRINAR® liquid primer/topcoat system (AAMA 2605-compliant) from Akzo Nobel, and Valspar A201 Alenco Poly 3500 liquid paint (AAMA 2603-compliant). Panels were evaluated with respect to the performance properties shown in Tables 12 and 13, all according to AAMA 2603 and 2605 respectively, except where indicated.

TABLE 12

Fresh & Aged Pretreatment, AAMA 2603 Liquid Paint

| Test | [2]Fresh Bath | [3]Aged Bath |
|---|---|---|
| Dry Adhesion | Pass | Pass |
| Wet Adhesion | Pass | Pass |
| Boiling Water Adhesion | Pass | Pass |
| Detergent Resistance | Pass | Pass |
| Impact Resistance | Pass | Pass |
| [1]Neutral Salt Spray 1500 hours | Scribe = 10 Field = 10 | Scribe = 10 Field = 10 |
| Humidity 1500 hours | 10 | 10 |

[1]Salt spray conditions per ASTM B117, panel evaluation per ASTM-D1654
[2]film thickness = 1.00-1.50 mil, pencil hardness = 2H
[3]film thickness = 1.40 mil, pencil hardness = 2H The 1500 hour neutral salt spray and humidity panels rated 10 per ASTM D-1654 as described above, i.e., zero creepage from scribe and zero blistering or paint loss.

TABLE 13

Fresh & Aged Pretreatment, AAMA 2605 Liquid Paint

| Test | [3]Fresh Bath | [4]Aged Bath |
|---|---|---|
| Dry Adhesion | Pass | Pass |
| Wet Adhesion | Pass | Pass |
| Boiling Water Adhesion | Pass | Pass |
| Detergent Resistance | Pass | Pass |
| Impact Resistance | Pass | Pass |
| [1]Acetic Acid Salt Spray 1000 hours | Pass | Pass |
| [2]Neutral Salt Spray 4000 hours | Pending | Pending |
| Humidity 4000 hours | Pending | Pending |

[1]per Qualicoat specifications, 9th edition, effective January, 2000
[2]Salt spray conditions per ASTM B117, panel evaluation per ASTM-D1654
[3]film thickness = 1.00-2.40 mil, pencil hardness = 2H
[4]film thickness = 1.55 mil, pencil hardness = 2H The 1000 hour acetic acid salt spray panels passed the Qualicoat specification with no infiltrations.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A composition for forming a protective coating on a metal surface, wherein the composition comprises water; $Cr_2(GF_6)_3$ in which G is a Group IV-B element; and at least one polymer having a plurality of carboxylic acid groups and at least one polymer having a plurality of hydroxyl groups, and/or at least one polymer having a plurality of both carboxylic acid and hydroxyl groups;
wherein the composition contains less than 500 ppm of alkali metal ions and less than 200 ppm of halide ions relative to chromium; and
wherein the composition contains one or more contaminating ions and each of said one or more contaminating ions is present at less than 1000 ppm relative to chromium, and wherein said one or more contaminating ions are ions that are not part of the canonical formula of $Cr_2(GF_6)_3$.

2. The composition of claim 1, wherein the composition tests negative for chromium VI using s-diphenylcarbazide.

3. The composition of claim 1, wherein G is zirconium.

4. The composition of claim 3, wherein the composition has a weight ratio of Zr:Cr in a range from 2.4:1 to 3.0:1.

5. The composition of claim 1, wherein G is titanium.

6. The composition of claim 1, comprising said at least one polymer having a plurality of carboxylic acid groups and said at least one polymer having a plurality of hydroxyl groups, wherein said polymers are a methyl vinyl ether maleic acid copolymer and polyvinyl alcohol, respectively.

7. The composition of claim 1, comprising said at least one polymer having a plurality of carboxylic acid groups and said at least one polymer having a plurality of hydroxyl groups, wherein said polymers are polyacrylic acid and polyvinyl alcohol, respectively.

8. A method of forming a protective coating on a metal surface, comprising contacting the metal surface with a composition and subsequently drying the contacted metal surface, wherein the composition comprises water;
$Cr_2(GF_6)_3$ in which G is a Group IV-B element; and at least one polymer having a plurality of carboxylic acid groups and at least one polymer having a plurality of hydroxyl groups, and/or at least one polymer having a plurality of both carboxylic acid and hydroxyl groups;
wherein the composition contains less than 500 ppm of alkali metal ions and less than 200 ppm of halide ions relative to chromium; and
wherein the composition contains one or more contaminating ions and each of said one or more contaminating ions is present at less than 1000 ppm relative to chromium, and wherein said one or more contaminating ions are ions that are not part of the canonical formula of $CR_2(GF_6)_3$.

9. The method of claim 8, wherein the composition tests negative for chromium VI using s-diphenylcarbazide.

10. The method of claim 8, wherein G is zirconium.

11. The method of claim 10, wherein the composition has a weight ratio of Zr:Cr in a range from 2.4:1 to 3.0:1.

12. The method of claim 8, wherein G is titanium.

13. The method of claim 8, wherein the composition comprises said at least one polymer having a plurality of carboxylic acid groups and said at least one polymer having a plurality of hydroxyl groups, wherein said polymers are a methyl vinyl ether maleic acid copolymer and polyvinyl alcohol, respectively.

14. The method of claim 8, wherein the composition comprises said at least one polymer having a plurality of carboxylic acid groups and said at least one polymer having a plurality of hydroxyl groups, wherein said polymers are polyacrylic acid and polyvinyl alcohol, respectively.

15. The method of claim 8, wherein the metal surface is Al, Zn or an alloy of either of these.

\* \* \* \* \*